United States Patent [19]
Hosokawa et al.

[11] Patent Number: 5,378,735
[45] Date of Patent: Jan. 3, 1995

[54] ULTRAVIOLET-CURING COVERING COMPOSITION WITH HARDWEARING PROPERTIES

[75] Inventors: Noritaka Hosokawa; Kazuhide Hayama, both of Yokkaichi, Japan

[73] Assignee: Mitsubishi Petrochemical Company, Ltd., Tokyo, Japan

[21] Appl. No.: 43,522

[22] Filed: Apr. 6, 1993

[30] Foreign Application Priority Data

Apr. 6, 1992 [JP] Japan .................................. 4-083929
Sep. 17, 1992 [JP] Japan .................................. 4-247767

[51] Int. Cl.$^6$ .......................... C08F 2/48; C08K 5/01; C08K 5/05
[52] U.S. Cl. ........................................ 522/79; 522/80; 522/84; 522/96; 522/99; 528/26; 528/32; 524/767; 524/768; 524/765; 524/766
[58] Field of Search ................ 522/84, 80, 79, 96, 522/99; 528/26, 32; 524/765, 766, 767, 768

[56] References Cited

U.S. PATENT DOCUMENTS

| | | | |
|---|---|---|---|
| 4,027,073 | 5/1977 | Clark | 428/412 |
| 4,374,937 | 2/1983 | Nemcek et al. | 523/116 |
| 4,455,205 | 6/1984 | Olson et al. | 428/412 |
| 4,478,876 | 10/1984 | Chung | 428/412 |
| 4,526,920 | 7/1985 | Sakashita et al. | 524/850 |
| 4,889,768 | 12/1989 | Yokoshima et al. | 428/429 |
| 5,242,719 | 9/1993 | Medford et al. | 427/515 |
| 5,260,350 | 11/1993 | Wright | 522/42 |

FOREIGN PATENT DOCUMENTS

| | | |
|---|---|---|
| 0243802 | 11/1987 | European Pat. Off. |
| 0424645 | 5/1991 | European Pat. Off. |
| 82/00295 | 2/1982 | WIPO |

*Primary Examiner*—Susan Berman
*Attorney, Agent, or Firm*—Oblon, Spivak, McClelland, Maier & Neustadt

[57] ABSTRACT

An ultraviolet-curing covering composition comprising Component A which is obtained by reacting a hydroxyl group-containing polyfunctional acrylate with a silane coupling agent containing an isocyanate group(s), Component B of a polyfunctional acrylate having 3 or more acryloyl groups in the molecule, Component C of a silica sol in an organic solvent, and Component D of a photopolymerization initiator. This composition forms a coating film shows excellent hardwearing properties and adhesion to plastic substrates after ultraviolet-curing. Blending Component E of an acrylic resin and Component F of a solvent to the composition forms a coating film which can be processed before curing.

8 Claims, No Drawings

ULTRAVIOLET-CURING COVERING COMPOSITION WITH HARDWEARING PROPERTIES

BACKGROUND OF THE INVENTION

1. Field of the Invention

The present invention relates to an ultraviolet-curing covering composition which forms a coating film having excellent hardwearing properties after curing. Particularly, the present invention relates to an ultraviolet-curing covering composition which forms a coating film having excellent adhesive properties, transparency and hardwearing properties. More particularly, the present invention relates to an ultraviolet-curing covering composition which forms a coating film upon evaporation of solvents, and which can be subjected to processing such as molding, printing and transfer before curing by ultraviolet light and can give a hard-coating having excellent hardwearing properties after curing.

1. Description of the Background Art

Plastic articles, for example, polycarbonate, polymethyl methacrylate, polyethylene terephthalate, polyvinyl chloride, ABS resin and the like have a variety of applications because their properties of lightness, easy processability, impact strength and the like are excellent. However, these plastic articles get scratched readily because of their low surface hardness. For example, transparent resins such as polycarbonates have disadvantages in that their inherent transparency or appearance is markedly lost; thus it is difficult to use these plastic articles in fields where hardwearing properties are required. For this reason, ultraviolet-curing hard coating materials are being sought which can impart hardwearing properties to these plastic articles and can increase their surface hardness.

When an ultraviolet-curing composition is applied to surfaces of these plastic articles, it is desirable that before curing, a coating layer can be processed or a coating layer which is coated on another substrate and, if necessary, printed, coated with an adhesive can be transferred to the surface of a plastic article. Therefore, an ultraviolet-curing covering composition which forms a coating film upon evaporation of solvents and imparts excellent hardwearing properties after curing has been sought.

Various hard coating compounds such as acrylic hard-coating compounds and silicon hard-coating compounds have been proposed as covering materials which can impart hardwearing properties to these plastic substrates and can increase surface hardness. Among these hard coating compounds, acrylic hard-coating compounds are characterized by shortened curing time and excellent productivity as they can be cured by irradiation of ultraviolet light, but they have the disadvantage of poor hardwearing properties compared with silicone hard-coating compounds.

To improve the hardwearing properties of these acrylic hard-coating compounds, Japanese Patent Publication (PCT) No.57-500984 disclosed an ultraviolet-curing covering composition in which silica sol in water as a dispersing medium and hydrolyzed silane compounds having acryloxy-functionality or glycidoxy-functionality are added to acrylate. However, as the silica sol used in the above-mentioned invention is water-dispersive there is a limitation in that a hydroxyl group-containing acrylate which has good miscibility with water must be used as an acrylate so that sufficient hardwearing properties can not be obtained.

Japanese Patent Publication Nos. 53-43553 and 57-20968 disclose hard coating compounds using polyfunctional acrylate having three functional groups or more to overcome the above-mentioned problems. Further, Japanese Patent Laid-Open Nos. 59-41366 and 63-92675 disclose that inorganic fillers and/or colloidal silica are added to these hard coating compounds to improve their hardwearing properties. Japanese Patent Laid-Open No. 59-204669 discloses a coating composition with hardwearing properties, in which a hydrophobic silica sol in an organic solvent as a dispersing medium and a hydrolyzed silane compound having unsaturated groups are added to a polyfunctional acrylate. As a hydrophobic silica sol in an organic solvent as a dispersing medium is used in this coating film composition, the selection range of applicable polyfunctional acrylates can be enlarged to further improve the surface hardness of plastic articles. However, the unsaturated group-containing silane compounds used in this composition such as 3-(meth)acryloxypropyl trimethoxysilane can not yet impart sufficient hardwearing properties equal to those of silicone hard coating compounds.

Further, as these ultraviolet-curing hard coating compounds, irrespective of containing solvents, do not have film-forming properties upon evaporation of the solvent, processing such as molding, printing and transfer of coating films could not be performed before irradiation of ultraviolet light.

Even though blending thermoplastic resins such as copolymers of (meth) acrylic ester may be considered to impart film forming properties to these hard coating compounds, the addition of just amounts to impart sufficient film-forming properties would greatly decrease the hardwearing properties, so hard coating compounds which are excellent in both film-forming properties and hardwearing properties have not yet been achieved.

SUMMARY OF THE INVENTION

As a result of intensive research to overcome the above-mentioned conventional problems, the present inventors have found a composition which can impart sufficient hardwearing properties without harming the transparency of the substrate, as well as a composition which forms coating films at the stage of evaporating solvents and imparts enough hardwearing properties by subjecting it to ultraviolet cure to achieve the present invention.

That is, the present invention provides an ultraviolet-curing covering composition with hardwearing properties comprising:

Component A: a compound which is obtained by reacting a hydroxyl group-containing polyfunctional acrylate having a hydroxyl group(s) and 3 or more acryloyl groups in the molecule with a silane coupling agent containing an isocyanate group(s) of the following general formula (1):

(wherein $R^1$ and $R^2$ are the same or different monovalent hydrocarbon groups, $R^3$ is a divalent hydrocarbon group having from 2 to 8 carbon atoms; and a is an integer of 2 to 3, b is an integer of 0 to 1, and c is an integer of 1 or 2 which is equal to 4-a-b );

Component B: a polyfunctional acrylate having 3 or more acryloyl groups in the molecule;

Component C: a silica sol in an orgnic solvent as a dispersing medium; and

Component D: a photopolymerization initiator.

The present invention also provides an ultraviolet-curing covering composition with hardwearing properties further comprising:

Component E: an acrylic resin; and

Component F: an organic solvent, in addition to the above-mentioned Components A, B, C and D.

This composition forms a coating film upon evaporation of solvents, then the obtained film can be subjected to processing such as molding, printing and transfer before irradiation of ultraviolet light; therefore, a coating film having an excellent hardwearing properties is formed after irradiation of ultraviolet light.

DETAILED DESCRIPTION OF THE INVENTION

The present invention will be further illustrated below.

Component A:

Component A represents a compound which is obtained by reacting a hydroxyl group-containing polyfunctional acrylate having a hydroxyl group(s) and 3 or more acryloyl groups in the molecule with a silane coupling agent containing an isocyanate group(s) of the following general formula (1):

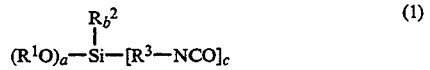

$$(R^1O)_a-Si-[R^3-NCO]_c \quad (1)$$
$$\quad\quad\quad |$$
$$\quad\quad\quad R_b^2$$

wherein $R^1$ and $R^2$ are the same or different monovalent hydrocarbon groups, preferably lower alkyl groups such as methyl, ethyl and propyl, $R^3$ is a divalent hydrocarbon group having from 2 to 8 carbon atoms, preferably from 2 to 3; and a is an integer of 2 to 3, b is an integer of 0 to 1, and c is an integer of 1 or 2 which is equal to 4-a-b.

Since this compound has 3 or more acryloyl groups and a trialkoxy silyl group or dialkoxy silyl group together in the molecule, the concentration of acryloyl groups barely decreases even when the compound and the polyfunctional acrylate of Component B are mixed. Further, when mixed with the silica sol of Component C, the trialkoxy silyl group or dialkoxy silyl group reacts with the silanol groups present on the surface of the silica sol particles. Both of these effects can impart hardwearing properties.

Examples of the silane-coupling agent containing an isocyanate group(s) of the general formula (1) include 3-isocyanatopropyl trimethoxysilane, 2-isocyanatoethyl trimethoxysilane, 3-isocyanatopropyl triethoxysilane, 2-isocyanatoethyl triethoxysilane, 3-isocyanatopropyl methyldimethoxysilane, 2-isocyanatoethyl methyldimethoxysilane, 3-isocyanatopropyl methyldiethoxysilane, 2-isocyanatoethyl methyldiethoxysilane, and the like.

Examples of the hydroxyl group-containing polyfunctional acrylates having a hydroxyl group(s) and 3 or more acryloyl groups in the molecule include pentaerythritol triacrylate, dipentaerythritol tetraacrylate, dipentaerythritol pentaacrylate, and mixtures thereof.

These compounds can also be used as Component B to be described below. By reacting the silane-coupling agent containing an isocyanate group(s) with a mixture of polyfunctional acrylate having a hydroxyl group(s) and polyfunctional acrylate not having a hydroxyl group(s), a mixture of Component A of the reaction product and Component B which is not yet reacted may be obtained.

The reaction of the silane-coupling agent containing an isocyanate group(s) with the polyfunctional acrylate having a hydroxyl group(s) can be carried out by mixing each compound at the ratio of —NCO group / —OH group $\leq 1$, and stirring at 60°–110° C. for 1–20 hr. In this reaction, polymerization inhibitors such as hydroquinone, hydroquinone monomethyl ether, catecol, p-tert-butyl catecol and phenothiazine, for example are preferably used to prevent polymerization during the reaction, and the amounts of the polymerization inhibitors to be used are 0.01–1%, preferably 0.05–0.5% by weight relative to the reaction mixture.

On the other hand, to promote the reaction, catalysts such as di-n-butyltin dilaurate and triethylenediamine, for example can be used. Further, this reaction may be carried out in the presence of polyfunctional acrylate having 3 or more acryloyl groups in the molecule (Component B) and the organic solvent (Component C).

Component B:

Component B represents a polyfunctional acrylate having 3 or more acryloyl groups in the molecule. Examples of the compound include trimethylolpropane triacrylate, EO-modified trimethylolpropane triacrylate, PO-modified trimethylolpropane triacrylate, trimethylolpropane tetraacrylate, tris(acryloxyethyl)isocyanurate, caprolactone-modified tris(acryloxyethyl)isocyanurate, pentaerythritol triacrylate, pentaerythritol tetraacrylate, dipentaerythritol tetraacrylate, dipentaerythritol pentaacrylate, dipentaerythritol hexaacrylate, alkyloyl-modified dipentaerythritol triacrylate, alkyloyl-modified dipentaerythritol tetraacrylate, alkyloyl-modified dipenta-erythritol pentaacrylate, caprolactone-modified dipenta-erythritol hexaacrylate, and a mixture of two or more thereof. Among them, dipentaerythritol hexaacrylate, dipentaerythritol pentaacrylate and a mixture thereof are preferably used in teems of hardwearing properties.

An acrylate having a hydroxyl group in the molecule can also be used, which may be the same acrylate as that used in the synthesis of the above-mentioned Component A.

Component A and Component B are preferably used at the ratios of Component A/Component B =0.1 to 10 (weight ratio) in terms of hardwearing properties of the ultraviolet-curing covering composition.

Component C:

Component C represents a silica sol in an organic solvent as a dispersing medium, and include a silica sol having a particle size of 5–30 nm and a solid content of 10–40%, which is dispersed in methyl alcohol, isopropyl alcohol, n-butyl alcohol, isobutyl alcohol, ethylene glycol, ethyl cellosolve, dimethyl acetamide, xylene and mixtures thereof. Among these dispersing agents, a silica sol in isopropyl alcohol, n-butyl alcohol, isobutyl alcohol, ethyl cellosolve, xylene and mixed solvents thereof are particularly preferred, because the silica sol in these solvents has good miscibility with Component A which is a reaction product of a silane coupling agent containing an isocyanate group(s) and a hydroxy group-containing polyfunctional acrylate having 3 or more acryloyl groups in the molecule, and Component B which is a polyfunctional acrylate having 3 or more acryloyl groups in the molecule, and an acrylic resin of Component E; and is also preferred in terms of transparency of the resultant coating film.

In the covering composition of the present first invention containing no acrylic resin of Component E, the silica sol in an organic solvent as a dispersing medium is preferably used at the ratios of the silica sol solid content of Component C/[Component A+Component B]=0.1-5 (weight ratio). Weight ratios less than 0.1 barely improve the hardwearing properties. On the other hand, a weight ratio of more than 5 decreases the hardwearing properties due to the decreased crosslinking density of acryloyl groups.

Component D:

Examples of the photopolymerization initiator include benzoinmethyl ether, benzoinethyl ether, benzoinisopropyl ether, benzoinbutyl ether, diethoxyacetophenone, benzyldimethyl ketar, 2-hydroxy-2-methylpropiophenone, 1-hydroxycyclohexyl phenylketone, benzophenone, 2,4,6-trimethylbenzoin diphenylphosphineoxide, 2-methyl-[4-(methylthio)phenyl]-2-morpholino-1-propanone, 2-benzyl-2-dimethylamino-1-(4-morpholinophenyl)-butane-1-on, Michiler's ketone, N,N-dimethylaminobenzoic acid isoamyl, 2-chlorothioxanthone, 2,4-diethylthioxanthone and the like, and two or more of these photopolymerization initiators can be used concomitantly. The amounts of these photopolymerization initiators to be used are 0.1 to 10 parts by weight, and preferably 1 to 5 parts by weight relative to the total amount of 100 parts by weight of Component A and B.

Component E:

Examples of the acrylic resin of Component E include the following Compounds (a) to (e).

Compound (a): Polymers or copolymers of acrylic or methacrylic acid esters.

Examples of polymers or copolymers of acrylic or methacrylic [referred to as "(meth)acrylic" hereinafter] acid esters include polymers or copolymers of one or more monomer (I) which have (meth)acryloyl groups such as (meth) acrylic acid, methyl (meth)acrylate, ethyl (meth) acrylate, n-butyl (meth)acrylate, iso-butyl (meth) acrylate, 2-ethylhexyl (meth)acrylate, benzyl (meth) acrylate, cyclohexyl (meth) acrylate, isobornyl (meth) acrylate, dicyclopentenyl (meth) acrylate, dicyclopentenyloxyethyl (meth)acrylate, cyanoethyl (meth) acrylate, glycidyl (meth) acrylate, 2-hydroxyethyl (meth)acrylate and 2-hydroxypropyl (meth)acrylate.

Compound (b): Polymers or copolymers of (meth) acrylic acid esters having (meth) acryloyl groups at their side chains.

Examples of polymers or copolymers of (meth)acrylic acid esters having (meth) acryloyl groups at their side chains include adducts such as a (meth)acrylic acid adduct to a polymer of glycidyl (meth)acrylate or a copolymer of glycidyl (meth)acrylate as a component, a glycidyl (meth)acrylate adduct to a copolymer of (meth) acrylic acid as a component, an isocyanate group-containing urethane (meth) acrylic acid ester adduct to a copolymer of a hydroxyl group-containing (meth)acrylic acid ester as a component, and the like.

Compound (c): Acrylic silicone resins having alkoxysilyl groups.

Acrylic silicone resins having alkoxysilyl groups are polymers consisting of the above-mentioned monomer (I) having (meth) acryloyl groups and monomer (II) having alkoxysilyl groups which react with monomer (I).

Examples of monomer (II) include monomers having unsaturated double bonds copolymerizable with monomer (I), such as γ-methacryloyloxypropyl trimethoxysilane, γ-methacryloyloxypropyl triethoxysilane, γ-methacryloyloxypropyl methyldimethoxysilane, vinyl trimethoxysilane, vinyl triethoxysilane, vinyl tri(ethoxymethoxy) silane and the like; and monomers having functional groups which cause addition reaction with monomer (I), such as γ-glycidoxypropyl trimethoxysilane, γ-glycidoxypropyl methyldiethoxysilane, γ-isocyanatopropyl trimethoxysilane, γ-isocyanatopropyl triethoxysilane, γ-isocyanatopropyl methyldimethoxysilane, γ-isocyanatopropyl methydiethoxysilane, γ-aminopropyl trimethoxysilane, γ-aminopropyl triethoxysilane, N-phenyl-γ-aminopropyl trimethoxysilane, γ-mercaptopropyl trimethoxysilane and γ-mercaptopropyl triethoxysilane.

The acrylic silicone resin having alkoxysilyl groups is obtained by copolymerization of monomer (I) having (meth)acryloyl groups and monomer (II) having alkoxysilyl groups and unsaturated double bonds copolymerizable with monomer (I). The acrylic silicone resin having alkoxysilyl groups is obtained by addition reaction of monomer (I) having (meth)acryloyl groups with monomer (II) having alkoxysilyl groups and functional groups which can cause the addition reaction with monomer (I), then by polymerization of the reaction product. Alternatively, the resin is obtained by polymerization of monomer (I) having (meth) acryloyl groups, then by addition reaction of monomer (II) having alkoxysilyl groups and functional groups which can cause the addition reaction of monomer (I) to the resultant polymer.

Compound (d): Acrylic silicone resins having alkoxysilyl groups and polyorganosiloxane units.

Acrylic silicone resins having alkoxysilyl groups and polyorganosiloxane units are polymers consisting of the above-mentioned monomer (I) having (meth)acryloyl groups, the above-mentioned monomer (II) having alkoxysilyl groups which react with monomer (I) and monomer (III) having polyorganosiloxane units which react with monomer (I).

Examples of monomer (III) having polyorganosiloxane units include (meth) acryloyl group-containing polyorganosiloxanes capable of copolymerizing with monomer (I), and polyorganosiloxane having mercapto group which can be introduced into a polymer through the sulfide bond by the chain transfer reaction during polymerization of monomer (I), and the like. The polyorganosiloxane unit contained in monomer (III) has the following general formula (2):

( wherein R is the same or different methyl or phenyl group, n is an integer of 5 or more.)

The acrylic silicone resin having alkoxysilyl group and polyorganosiloxane units is obtained by carting out copolymerization of monomer (I) having (meth)acryloyl groups, monomer (II) having unsaturated double bonds copolymerizable with monomer (I) and alkoxysilyl groups, and monomer (III) having polyorganosiloxane units which react with monomer (I). Alternatively, this acrylic silicone resin may be obtained by addition reaction of monomer (I) with monomer (II) followed by copolymerizing the reaction product with monomer (III). Still alternatively, the acrylic silicone resin may be obtained by copolymerization of monomer (I) and monomer (III) followed by addition reaction of monomer (II).

Compound (e): Polymers or copolymers of (meth)acrylic acid esters having polyorganosiloxane units.

Polymers or copolymers of (meth)acrylic acid esters having polyorganosiloxane units are polymers consisting of the above-mentioned monomer (I) having (meth)acryloyl groups and the above-mentioned monomer (III) having polyorganosiloxane units which react with monomer (I).

The acrylic resin of the above-mentioned Component E, for example, one of the compounds (a) to (e), is prepared by polymerization, and if necessary, by addition reaction of the above-mentioned monomers (I), (II) and (III) in an organic solvent using a conventional method.

The polymerization initiators to be used in the polymerization include peroxides such as benzoyl peroxide, di-tert-butyl peroxide and cumene hydroperoxide, and azo compounds such as azobisisobutyronitrile and azobisvalero-nitrile, which are common radical polymerization initiators. The monomer concentrations are usually 10 to 60% by weight, and the concentrations of these polymerization initiators are usually 0.1 to 10% by weight relative to those of mixtures the monomers.

On the other hand, in the cases of addition reaction, for example, the addition reaction of epoxy groups with carboxyl groups, catalysts such as benzyl dimethylamine, triethylamine, tributylamine, triethylenediamine, benzyl trimethylammonium chloride, benzyl triethylammonium bromide, tetramethylammonium bromide, cetyl trimethylammonium bromide and triphenyl stilbene. The catalysts are usually used at the ratios of 0.1–5% by weight relative to a mixture of the monomers.

Further, in the cases of addition reaction of hydroxyl groups with isocyanate groups, such catalysts as di-n-butyltin dilaurate and triethylenediamine can be used. These catalysts are usually used at the ratios of 0.01–0.1% by weight relative to a mixture of the monomers.

In the covering composition of the present second invention containing an acrylic resin of Component E, it is desirable that the ratios of Component A, Component B, the silica sol solid content of Component C, and Component E relative to the total weight thereof be as follows:

| | |
|---|---|
| Component A + Component B | 25–60% by weight, preferably 30–50% by weight; |
| Solid content of Component C | 20–70% by weight, preferably 30–60% by weight; |
| Component E | 5–35% by weight, preferably 10–30% by weight; | and the weight ratio of Component A/Component B be 0.2 or more, preferably 0.5 or more in terms of film-forming properties and hardwearing properties of possibly obtained ultraviolet-curing coating films.

The amount of Component D to be used are 0.1 to 10 parts by weight, and preferably 1 to 5 parts by weight relative to the total amount of 100 parts by weight of Component A, B and E.

The use of less than 5% by weight of acrylic resin of Component E results in poor film-forming properties, whereas the use of more than 35% by weight results in insufficient hardwearing properties.

The use of less than 25% by weight in a total amount of Component A and Component B lowers the hardwearing properties due to the decreased crosslinking density of the acryloyl groups. On the other hand, the use of more than 60% degrades the film-forming properties.

Further, in the covering composition of the present second invention, a part of Component B may be replaced by urethane-acrylate having 2 or more acryloyl groups in the molecule. Examples of the compound include isocyanate-prepolymer obtained by addition reaction of polyol with polyisocyanate compound or the reaction of polyisocyanate compound with hydroxyl group-containing acrylate.

Examples of polyol include ethylene glycol, propylane glycol, tetramethylene glycol, hexamethylene glycol, trimethylolprpane, glycerin, polyethylene glycol, polypropylene glycol, copolymer of polyethylene glycol and polypropylene glycol, polytetramethlene glycol, polycarbonate diol, polyester polyol obtained by condensation reaction of adipic acid and ethylene glycol, and the like.

Examples of polyisocyanate compound include tolylene diisocyanate, isophoron diisocyanate, hexamethylene diisocyanate, xylene diisocyanate, diphenylmethane diisocyanete, naphtharene diisocyanate, xylene diisocyanate, diphenylmethane diisocyanate, naphtharene diisocyanate, olygomers containing bulet or isocyanul structure of the above-mentioned polyisocyanate compound mainly consisting trimer of the compound, and the like.

Examples of the hydroxyl group-containing acrylate include hydroxyethylacrylate, hydroxypropylacrylate, pentaerythrytoltriacrylate, dipentaerythrytoltetraacrylate, dipentaerythrytolpentaacrylate, and the like.

The reaction of polyol with polyisocyanate compound can be carried out by mixing each compound at the ratio of —OH group/—NCO group < 1, and stirring at 60°–110° C. for 1–20 hr. The reaction of polyisocyanate compound with hydroxyl group-containing acrylate can by carried out by the same manner as mentioned in the preparation of Component A. Among these, urethane-acrylate obtainend by the reaction of polyisocyanate compound with hydroxyl group-containing acrylate are preferably used in term of hardwearing and film-forming properties.

The amount of urethane-acrylate to be used in Component B are less than 0.5 by weight relative to the total amount of polyfunctional acrylate having 3 or more acryloyl group in the molecule and urethane-acrylate having 2 or more acryloyl groups in the molecule.

When the ratio of Component A/Component B is below 0.2 the crosslinking formation between alkoxysilyl groups of Component A and silica sol of Component C decreases, accompanied by the degraded hardwearing properties and film-forming properties. Although there are no upper limitations on the ratio, that of around 10 is generally selected in view of commercial availability.

Further, the use of less than 20% by weight of silica sol solid content of Component C hardly improves the hardwearing properties ascribed to silica sol, whereas that of more than 70% by weight of Component C makes Component A and Component B decrease relatively, accompanied by the lowered hardwearing properties because the crosslinking density of the acryloyl groups is decreased.

Component A obtained by reacting a hydroxyl group-containing polyfunctional acrylate having a hydroxyl group(s) and 3 or more acryloyl groups in the molecule with a silane coupling agent containing an isocyanate group(s) has 3 or more acryloyl groups and trialkoxysilyl groups or dialkoxysilyl groups in the same molecule. Therefore, Component A and B can be mixed with little decrease of the concentration of acryloyl groups and attain high hardwearing properties. Further, the trialkoxysilyl groups or dialkoxysilyl groups which are present in the molecule of Component A react with the silanol groups which are present in the surface of the silica sol of Component C; therefore only the polyfunctional acrylate of Component B remains in the form of a liquid at the time of evaporation of solvents so as to need a little acrylic resin of Component E which is blended in order to impart film-forming properties. In addition, the silica sol of Component C imparts hardwearing properties, and makes the amount of Component B in the form of a liquid decrease relatively. These findings indicate that the covering composition of the present invention can impart film-forming properties, without decreasing the hardwearing properties.

Component F:

The organic solvents of Component F include aromatic hydrocarbons such as toluene and xylene; esters such as ethyl acetate, propyl acetate and butyl acetate; alcohols such as ethyl alcohol, n-propyl alcohol, isopropyl alcohol and n-butyl alcohol; ketones such as methyl ethyl ketone, methyl isobutyl ketone and cyclohexanone; ethers such as 2-methoxy ethanol, 2-ethoxy ethanol, 2-butoxy ethanol, ethylene glycol dimethyl ether, ethylene glycol diethyl ether and diethylene glycol dimethyl ether; ether esters such as 2-methoxyethyl acetate, 2-ethoxyethyl acetate and 2-butoxyethyl acetate. A mixture thereof also may be used.

These organic solvents can be used in order to prepare Component A and Component E as well as to adjust the viscosity of the ultraviolet-curing covering composition of the present invention.

For the purpose of improving the physical properties of coating films, various additives that are normally added to these kinds of compositions may be added to the ultraviolet-curing covering composition with hardwearing properties of the present invention, for example as ultraviolet absorbers (e.g., benzotriazol series, benzophenone series, salicylic series and cyanoacrylic series), ultraviolet stabilizers (e.g., hindered amine series), antioxidants (e.g., phenolic series, sulfur series, phosphorous series), anti-blocking agents, slip agents and leveling agents.

The covering composition of the present first invention can be coated on the surface of plastic substrates such as polycarbonate, polymethyl methacrylate, polyethylene terephthalate, polyvinyl chloride, ABS resin and the like with a coating machine according to coating methods such as dipping, flowcoating, spray and bar-coating methods, and the gravure coating, roll coating, blade coating and air-knife coating under conditions so that hard coating layers having a thickness of 1-50 μm, preferably 3-20 μm can be obtained, after evaporation of solvents and irradiation of ultraviolet light. These methods can impart enough hardwearing properties to the substrate resins without losing their inherent transparency.

The ultraviolet cure is carried out by irradiation of ultraviolet light for 1-60 seconds using lamps such as xenon lamps, low-pressure mercury-vapor lamps, high-pressure mercury-vapor lamps, ultra-high-pressure mercury-vapor lamps, metal halide lamps, carbon arc lamps and tungsten lamps.

Further, the covering composition of the present invention can be cured by irradiation of other active energy beam, such as electron beam normally carry out from 20~2000 kV electron beam accelater, α-ray, β-ray, γ-ray, and the like. In this case Component D is not always necessary to be added.

The covering composition of the present second invention, which contains acrylic resin of Component E, forms coating films after evaporation of solvents, and therefore, if necessary, can be subjected to processing such as molding, printing and transfer before ultraviolet cure.

Examples of molding include the molding involving substrate in which substrates coated with hard coating compounds are molded by methods such as vacuum molding, vacuum-pressure molding, compression molding and mat molding after elevation to an appropriate temperature; and the molding of a coated layer alone in which an irregular surface such as interference fringe is embossed on the coated layer as in the cases where compact disks and records are duplicated.

Printing is carried out on a dried hard coating compound by a normal printer.

Transfer is carried out by coating the hard coating compound of the present invention on, for example, a substrate such as a polyethylene terephthalate film, and after being dried, if necessary, the above-mentioned printing, embossing and the like being performed, the adhesive layer is then coated, and transfer is carried out to another desired substrate.

After the processing, the above-mentioned ultraviolet cure is carried out, resulting in surface coverings which have excellent hardwearing properties.

EXAMPLES

The methods of the present invention are illustrated with reference to the following examples, but the invention is not intended to be limited only to thereto.

The parts and the percentages in the following Examples denote parts by weight and % by weight, respectively.

Example 1

205 g of 3-isocyanatopropyl trimethoxysilane, and 813 g of the mixture of dipentaerythritol pentaacrylate (67 mole %) and dipentaerythritol hexaacrylate (Nihon Kayaku, Kayarad DPHA, a hydroxyl number of 69 mg KOH/g) were placed into a flask so that the ratio of —NCO group/—OH group became 1, to which 1 g of hydroquinone monomethyl ether and 0.2 g of di-n-butyltin dilaurate were added, and reacted at 110° C. for 3 hr. When the reaction product was analyzed by infrared absorption spectrum, no absorption due to —NCO group at 2250 cm$^{-1}$ was observed showing completion of the reaction. The resultant composition (I) consisted of 71.6% of the reaction product of 3-isocyanatopropyl trimethoxysilane and dipentaerythritol pentaacrylate, and 28.4% of dipentaerythritol hexaacrylate.

Thirty parts of the composition (I), 100 parts of silica sol in xylene and n-butyl alcohol as dispersing agents (Nissan Kagaku, XBA-ST: a solid content of 30%, xylene of 45% and n-butyl alcohol of 25%), and 1.5 parts of benzyl dimethylketar were mixed to obtain an ultraviolet-curing covering composition (A-1).

The ultraviolet-curing covering composition (A-1) was coated on a transparent polycarbonate board of 2 mm thick using a bar coater so as to obtain a coating film of 10 μm thick after drying, and heated at 100° C. for 10 min to dryness. The dried coating film on the board was ultraviolet-cured by irradiation of a ultraviolet light using a high-pressure mercury vapor lamp of 7.5 kw and an output density of 120 w/cm which was set up vertically to the direction of the samples passing at a conveyor speed of 2 m/min and 10 cm below the light source.

The hard coating layer formed on the polycarbonate board was evaluated for adhesion properties as follows. One hundred 1 mm$^2$ cross-cut squares were prepared by cutting the hard coating layer using a cutter. Nichiban adhesion tape was adhered thereto and then strongly peeled off, resulting in good adhesion properties of 100/100 (cross-cut tape test on the basis of JIS K5400).

After hard-coating, the resultant polycarbonate board was also evaluated for transparency as % haze. The board had a haze of 0.5%, showing good transparency. Before coating with a hard coating compound, the polycarbonate board of 2 mm thick had a haze of 0.5%. Haze is represented by Td/Tt×100, wherein Td is permeability of scattered light and Tt is permeability of total light, based on JIS K7105.

Next, the hardwearing properties of the resultant board was measured by Taber abrasion test (500 gram load, and 100 revolutions) using a Calibrase CS-10F truck wheel. The difference in haze before and after Taber abrasion test, ΔH, was no more than 0.6%, showing good hardwearing properties. On the other hand, a 2 mm thick polycarbonate board which was not coated with a hard coating compound had a ΔH of 46.7%, which was also measured by the Taber abrasion test on the basis of ASTM D1044.

Example 2

30 parts of the composition (I) obtained in Example 1, 50 parts of silica sol in xylene and n-butyl alcohol as dispersing agents (Nissan Kagaku, XBA-ST) and 1.1 parts of benzyl dimethylketal were mixed to obtain an ultraviolet-curing covering composition (A-2).

A hard-coated polycarbonate board was obtained by the same method as that in Example 1 except that the ultraviolet-curing covering composition (A-2) was used.

When the board was evaluated for adhesion properties, transparency and hardwearing properties according to the same procedures as in Example 1, the following good results were obtained: adhesion properties, 100/100; haze, 0.6%; and ΔH, 0.8%.

Example 3

30 parts of the composition (I) obtained in Example 1, 200 parts of silica sol in xylene and n-butyl alcohol as dispersing agents (Nissan Kagaku, XBA-ST) and 2.2 parts of benzyl dimethylketal were mixed to obtain an ultraviolet-curing covering composition (A-3).

A hard-coated polycarbonate board was obtained by the same method as that in Example 1 except that the ultraviolet-curing covering composition (A-3) was used.

When the board was evaluated for adhesion properties, transparency and hardwearing properties according to the same procedures as that in Example 1, the following good results were obtained: adhesion properties, 100/100; haze, 0.5%; and ΔH, 0.5%.

Example 4

Using the same method as that in Example 1 except that a transparent polyethylene terephthalate film of 100 μm thick was used instead of the 2 mm thick polycarbonate board obtained in Example 1, a hard-coated polyethylene terephthalate film was obtained.

The hard coating layer formed on the polyethylene terephthalate film was evaluated for adhesion properties with polyethylene terephthalate, resulting in good adhesion properties of 100/100.

The resultant polyethylene terephthalate film was also evaluated for transparency as % haze. The film had a haze of 3.7%, showing good transparency. Before hard coating the polyethylene terephthalate film 100 μm in thickness had a haze of 3.7%.

Next, when evaluated for hardwearing properties, the resultant film had a ΔH of 0.5%, showing good hardwearing properties. On the other hand, a 100 μm thick polyethylene terephthalate film which was not hard-coated had a ΔH of 23.1%.

Example 5

198 g of 3-isocyanatopropyl triethoxysilane and 813 g of Kayarad DPHA used in Example 1 were placed into a flask so that the ratio of —NCO group/—OH group became 0.8, to which 1 g of hydroquinone monomethyl ether and 0.2 g of di-n-butyltin dilaurate were added, and this was reacted at 110° C. for 3 hr. When this reaction product was analyzed for infrared absorption spectrum, the absorption due to —NCO group at 2250 cm$^{-1}$ was not observed, showing that the reaction was completed. The resultant composition (II) consists of 61.0% of the reaction product of 3-isocyanatopropyl triethoxysilane and dipentaerythritol pentaacrylate, 28.6% of dipentaerythrital hexaacrylate, and 10.4% of dipentaerythritol pentaacrylate.

Thirty parts of the composition (II), 100 parts of silica sol in xylene and n-butyl alcohol as dispersing agents (Nissan Kagaku, XBA-ST), and 1.5 parts of benzyl dimethylketar were mixed to obtain an ultraviolet-curing covering composition (A-4).

A hard-coated polycarbonate board was obtained by the same method as that in Example 1 except that the ultraviolet-curing covering composition (A-4) was used.

When the board was evaluated for adhesion properties, transparency and hardwearing properties according to the same procedures as in Example 1, the following good results were obtained: adhesion properties, 100/100; haze, 0.5%; and ΔH, 0.9%.

Example 6

133 g of 3-isocyanatopropyl methyl dimethoxysilane and 813 g of Kayarad DPHA used in Example 1 were placed into a flask so that the ratio of —NCO group/—OH group became 0.7, to which 0.9 g of hydroquinone monomethyl ether and 0.2 g of di-n-butyltin dilaurate were added and this was reacted at 110° C. for 3 hr. When this reaction product was analyzed for infrared absorption spectrum, no absorption due to —NCO group at 2250 cm$^{-1}$ was observed, showing that the reaction was completed. The resultant composition (III) consisted of 52.9% of the reaction product of 3-isocyanatopropyl methyl dimethoxysilane and dipentaerythritol pentaacrylate, 30.5% of dipentaerythritol hexaacrylate, and 16.6% of dipentaerythritol pentaacrylate.

20 parts of the composition (III), 100 parts of silica sol in n-butyl alcohol as a dispersing medium (Nissan Kagaku, NBA-ST: a solid content of 20% and n-butyl alcohol of 80%), and 1 part of benzyl dimethylketar were mixed to obtain an ultraviolet-curing covering composition (A-5).

A hard-coated polycarbonate board was obtained by the same method as that in Example 1 except that the ultraviolet-curing covering composition (A-5) was used.

When the board was evaluated for adhesion properties, transparency and hardwearing properties according to the same procedures as in Example 1, the following good results were obtained: adhesion properties, 100/100; haze, 0.8%; and ΔH, 1.0%.

Comparative Example 1

When 30 parts of the composition (I) obtained in Example 1 and 100 parts of silica sol in water as a dispersing medium (Nissan Kagaku, ST-30: a solid content of 30% and water of 70%) were mixed with stirring, the solution showed white turbidity and separated after standing, not producing a transparent ultraviolet-curing covering composition.

Comparative Example 2

20.5 g of 3-isocyanatopropyl trimethoxysilane, and 340 g of silica sol in xylene and n-butyl alcohol as dispersing agents (Nissan Kagaku, XBA-ST) were placed into a flask, to which 0.4 g of hydroquinone monomethyl ether and 0.07 g of di-n-butyltin dilaurate were added, and these were reacted at 80° C. for 3 hr. When this reaction product was analyzed for infrared absorption spectrum, no absorption due to —NCO group at 2250 cm$^{-1}$ was observed, showing that the reaction of 3-isocyanatopropyl trimethoxysilane and n-butyl alcohol as a dispersing medium for silica sol was completed.

To 106 parts of the reaction product were mixed 24 parts of Kayarad DPHA used in Example 1 and 1.5 parts of benzyl dimethylketal to obtain an ultraviolet-curing covering composition (B-1).

A hard-coated polycarbonate board was obtained by the same method as that in Example 1 except that the ultraviolet-curing covering composition (B-1) was used.

When the board was evaluated for adhesion properties, transparency and hardwearing properties according to the same procedures as in Example 1, the following results were obtained: adhesion properties, 100/100; haze, 1.2%; and ΔH, 5.7%, showing poor hardwearing properties.

Comparative Example 3

205 g of 3-isocyanatopropyl trimethoxysilane and 116 g of 2-hydroxyethyl acrylate were placed into a flask so that the ratio of —NCO group/—OH group became 1, to which 0.3 g of hydroquinone monomethyl ether and 0.06 of di-n-butyltin dilaurate were added, these were reacted at 100° C. for 3 hr. When this reaction product was analyzed for infrared absorption spectrum, no absorption due to —NCO group at 2250 cm$^{-1}$ was observed, showing that the reaction was completed.

20 parts of the compound obtained, 10 parts of Kayarad DPHA used in Example 1, 100 parts of silica sol in xylene and n-butyl alcohol as dispersing agents (Nissan Kagaku, XBA-ST), and 0.75 parts of benzyl dimethylketal were mixed to obtain an ultraviolet-curing covering composition (B-3).

A hard-coated polycarbonate board was obtained by the same method as that in Example 1 except that the ultraviolet-curing covering composition (B-3) was used.

When the board was evaluated for adhesion properties, transparency and hardwearing properties according to the same procedures as in Example 1, the following results were obtained: adhesion properties, 100/100; haze, 0.5%; and ΔH, 7.8%, showing poor hardwearing properties.

Example 7

A mixture of 100 parts of methyl methacrylate and 150 parts of methyl ethyl ketone was heated to a temperature of 80° C. Both upon the temperature elevation and two hours after the elevation, 0.3 part of azobisisobutyronitrile was added to the mixture, which was reacted at 80° C. for 8 hr, then a 40% solution of polymethyl methacrylate in methyl ethyl ketone.

25 parts of the thus obtained 40% solution of the polymethyl methacrylate in methyl ethyl ketone, 40 parts of the composition (I) obtained in Example 1, 167 parts of silica sol (Nissan Kagaku, XBA-ST), and 1.5 parts of benzyl dimethylketar were mixed to obtain an ultraviolet-curing covering composition (C-1).

The ultraviolet-curing covering composition (C-1) was coated on a 2 mm thick polycarbonate board so as to obtain a coating film of 10 μm thick using a bar coater after drying, then dried at 100° C. for 10 min. After drying, the polycarbonate board had no tack on the surface, showing that the covering composition had film-forming properties. This board was ultraviolet-cured as in Example 1.

When the thus obtained board was evaluated for adhesion properties, transparency and hardwearing properties according to the same procedures as that in Example 1, the following results were obtained: adhesion properties, 100/100; haze, 0.7%; and ΔH, 5.2%, showing good hardwearing properties.

Example 8

A mixture of 70 parts of methyl methacrylate, 20 parts of glycidyl methacrylate and 150 parts of toluene was heated to a temperature of 80° C. Both upon the temperature elevation and two hours after the elevation, 0.3 part of azobis-isobutyro-nitrile was added to the mixture which was reacted at 80° C. for 6 hr. After the temperature was then elevated to 110° C., 10 parts of acrylic acid and 1 part of trimethylammonium bromide were added to the mixture, which was reacted at 110° C. for 6 hr, resulting in a 40% solution of a compound having acryloyl groups at the side chains in toluene. The solution had an acid value of 2 mg KOH/g.

50 parts of the 40% solution of this compound in toluene, 30 parts of the composition (I) obtained in Example 1, 167 parts of silica sol in isopropyl alcohol as a dispersing medium (Nissan Kagaku, IPA-ST: a solid content of 30% and isopropyl alcohol of 70%), and 1.5 parts of benzyl dimethylketal were mixed to obtain an ultraviolet-curing covering composition (C-2).

A hard-coated polycarbonate board was obtained by the same method as that in Example 1 except that the ultraviolet-curing covering composition (C-2) was used. The polycarbonate board after drying had no tack on the surface, showing that the covering composition had film-forming properties.

When the board was evaluated for adhesion properties, transparency and hardwearing properties according to the same procedures as in Example 1, the following good results were obtained: adhesion properties, 100/100; haze, 0.6%; and ΔH, 7.5%.

Example 9

A mixture of 90 parts of methyl methacrylate, 10 parts of γ-methacryloyloxypropyl methoxysilane and 150 parts of methyl ethyl ketone was heated to a temperature of 80° C. Both upon the temperature elevation and two hours after the elevation, 0.3 part of azobisisobutyronitrile was added to the mixture, which was reacted at 80° C. for 8 hr, resulting in a 40% solution of acrylic silicon resin having alkoxysilyl groups in methyl ethyl ketone.

37.5 parts of the thus obtained 40% solution of acrylic silicon resin in methyl ethyl ketone, 50 parts of the composition (II) obtained in Example 5, 117 parts of silica sol (IPA-ST), and 1.5 parts of benzyl dimethylketar were mixed to obtain an ultraviolet-curing covering composition (C-3).

A hard-coated polycarbonate board was obtained by the same method as that in Example 1 except that the ultraviolet-curing covering composition (C-3) was used. The polycarbonate board after drying had no tack on the surface, showing that the covering composition had film-forming properties.

When the board was evaluated for adhesion properties, transparency and hardwearing properties according to the same procedures as in Example 1, the following good results were obtained: adhesion properties, 100/100; haze, 0.6%; and ΔH, 6.8%.

Example 10

A mixture of 89 parts of methyl methacrylate, 10 parts of γ-methacryloyloxypropyl methoxysilane, 1 part of polyorgano-siloxane having mercapto groups at the both ends (Shinetu Kagaku Kogyou, X-22-167B) and 150 parts of methyl ethyl ketone was heated to a temperature of 80° C. Both upon the temperature elevation and two hours after the elevation, 0.3 part of azo-bis-isobutyronitrile was added to the mixture, which was reacted at 80° C. for 8 hr, resulting in a 40% solution of acrylic silicon resin having alkoxysilyl groups at the side chains and polyorganosiloxane units in methyl ethyl ketone.

25 parts of the thus obtained 40% solution of acrylic silicon resin in methyl ethyl ketone, 50 parts of the composition (II) obtained in Example 5, 133 parts of silica sol (IPA-ST), and 1.5 parts of benzyl dimethylketal were mixed and cured to obtain an ultraviolet-curing covering composition (C-4).

A hard-coated polycarbonate board was obtained by the same method as that in Example 1 except that the ultraviolet-curing covering composition (C-4) was used. The polycarbonate board after drying had no tack on the surface, showing that the covering composition had film-forming properties.

When the board was evaluated for adhesion properties, transparency and hardwearing properties according to the same procedures as that in Example 1, the following good results were obtained: adhesion properties, 100/100; haze, 0.5%; and ΔH, 5.3%.

Example 11

By the same method as that in Example 7 except that the covering composition obtained in Example 10 and a transparent, polyethylene terephthalate film of 100 μm thick were used, a hard-coated polyethylene terephthalate film was obtained.

The hard coating layer formed on the polyethyleneterephthalate film was evaluated for adhesion properties with polyethylene terephthalate, resulting in good adhesion properties of 100/100.

The resultant polyethyleneterephthalate film was also evaluated for transparency as % haze. The film had a haze of 3.8%, showing good transparency. Before hard coating the polyethylenterephthalate film of 100 μm thick had a haze 3.7%.

Next, when evaluated for hardwearing properties, the resultant film had a ΔH of 6.4%, showing good hardwearing properties. On the other hand, a 100 μm thick polyethylene-terephthalate film which was not hard-coated had a ΔH of 23.1%.

Example 12 [Application Example]

The ultraviolet-curing covering composition (C-1) obtained in Example 7 was coated on a coated paper subjected to offset printing with a bar coater so as to obtain a coating film having a thickness of 10 μm after drying, and heated at 80° C. for 3 min to dryness. The dried coating film was embossed, then ultraviolet-cured by irradiation of ultraviole light under the same conditions as those in Example 1 to form a transparent relief layer on the coated paper. This process provided a printed material which had a 3-dimesional feeling. The covering composition (C-1) not only imparted good hardwearing properties, but also was excellent in emboss processability.

Example 13

The ultraviolet-curing covering composition (C-4) obtained in Example 10 was coated on a 100 μm thick polyethylene terephthalate film so as to obtain a coating film having a thickness of 10 μm after drying, which was heated at 100° C. for 10 min; then the dried film was printed with patterns by gravure printing, and further an acrylic adhesive (hot stamping agent) was applied on it for heat sealing. The film was placed with the acrylic adhesive face down so as to contact the adhesive surface on the plywood, and the surface layer of the film which is consisting adhesive, printing patterns and a covering composition (C-4) was heat-transferred with a heated roller. The film was then peeled off to make the ultraviolet-curing covering composition (C-4) on the plywood, then cured by irradiation of ultraviole light under the same conditions as those in Example 1.

The resultant plywood may be used as wall covering material, because the covering composition (C-4) not only provides the surface with smooth hardwearing properties, but also is excellent in pattern printing and peeling processability of the films.

Comparative Example 4

40 parts of the composition (I) Obtained in Example 1, 167 parts of silica sol (XBA-ST) and 1.5 parts of benzyl dimethylketal were mixed to obtain an ultraviolet-curing covering composition (D-1).

The ultraviolet-curing covering composition (D-1) was coated on a transparent, 2 mm thick polycarbonate board with a bar coater so as to obtain a coating film having a thickness of 10 μm after drying, then the coated board was heated at 100° C. for 10 min to dryness. However, the dried polycarbonate board had tack on the surface, showing that the covering composition did not have film-forming properties.

Comparative Example 5

25 parts of the 40% solution of polymethyl methacrylate in methyl ethyl ketone obtained in Example 7, 40 parts of Karayad DPHA, 167 parts of silica sol (IPA-ST) and 1.5 parts of benzyl dimethylketal were mixed to obtain an ultraviolet-curing covering composition (D-2). A hard-coated polycarbonate board was obtained by the same method as that in Example 1 except that the ultraviolet-curing covering composition (D-2) was used. The dried polycarbonate board was a little tacky on the surface, showing that the covering composition did not have enough film-forming properties.

When the board was evaluated for adhesion properties, transparency and hardwearing properties according to the same procedures as that in Example 1, the following results were obtained: adhesion properties, 100/100; haze, 0.6%; and $\Delta H$, 18.5%, showing poor hardwearing properties.

Comparative Example 6

37.5 parts of the 40% solution of acrylic silicon resin obtained in Example 9 in methyl ethyl ketone, 50 parts of the composition (II) obtained in Example 5 and 1.5 parts of benzyl dimethylketal were mixed to obtain an ultraviolet-curing covering composition (D-3).

A hard-coated polycarbonate board was obtained by the same method as that in Example 1 except that the ultraviolet-curing covering composition (D-3) was used. The dried polycarbonate board was a little tacky on the surface, showing that the covering composition did not have enough film-forming properties.

When the board was evaluated for adhesion properties, transparency and hardwearing properties according to the same procedures as that in Example 1, the following results were obtained: adhesion properties, 100/100; haze, 0.7%; and $\Delta H$, 16.4%, showing poor hardwearing properties.

Example 14

40 % solution og polymethyl methacrylate in methyl ethyl ketone was obtained using same method in Example 7.

Next, 111 parts of isophoron diisocyanate, and 116 parts of hydroxyethyl acrylate were placed into a flask so that the ratio of —NCO group/—OH group became 1, to wich 0.2 part of hydroquinone monomethyl ether and 0.04 part of di-n-butyltin dilaurate were added, and reacted at 110° C. for 4 hr. When the reaction product (urethan-acrylate) was analyzed by intrared adsorption spectrum, no adsorption due to —NCO group at 2250 cm$^{-1}$ was observed showing completion of the reaction.

40 parts of thus obtained 40% solution of polymethyl methacrylate in methyl ethyl ketone, 30 parts of the composition (I) obtained in Example 1, 20 parts of the urethan-acrylate thus obtained, 120 parts of silica sol (Nissan Kagaku, XBA-ST), 50 parts of methyl ethyl ketone, and 1.5 parts of benzyl dimethylketal were mixed to obtain an ultraviolet-curing composition (E-1).

A coated polycarbonate board was obtained by the same method as in Example 1 except that transparent polycarbonate board of 1 mm thickness and the ultraviolet-curing composition (E-1) was used. The polycarbonate board after drying had no tack on the surface showing that the covering composition had film-forming properties.

When the thus obtained board was evaluated for transparency according to the same procedures as in Example 1, The board has a haze of 0.5 %, showing good transparency. Before coating with a hard coat compound, the polycarbonate board of 1 mm thick has a hase 0.4%.

Next, hardwearing properties was measured according to the same procedures as in Example 1, and $\Delta H$ was no more than 5.8%, showing good hardwearing properties. On the other hand, 1 mm thick polycarbonate board wich was not coated with a hard coating compound had a $\Delta H$ of 46.7%.

Then the thus obtained board was heated to be 185° C. of the surface temperature by using vacum molding machine with metal mold of the 150 mm×200 mm length and 30 mm depth, thenafter the board was molded at an area ratio (board area after molded/board area before molded) of 1.7. There was no crack at the hardcoated layer of thus obtained molded board, showing good formed material obtained.

Example 15

40% solution of acrylic silicon resin having alkoxysilyl group in methyl ethyl ketone was obtained using same method in Example 9.

37.5 parts of thus obtained 40% solution of acrylic silicon resin having alkoxysilyl group in methyl ethyl ketone, 20 parts of the composition (II) obtained in Example 5, 30 parts of the urethan-acrylate obtained in Example 14, 117 parts of silica sol (IPA-ST), and 50 parts of methyl ethyl ketone were mixed to obtain a composition (E-2).

This curing composition (E-2) was coated on a 1 mm thick polycarbonate board so as to obtain a coating film of 10 μm thick using a bar coater after drying, then dried at 100° C. for 10 min. After drying, the polycarbonate board had no tack on the surface showing that the covering composition had film-forming properties. This board was electron beam-cured by irradiation of 5M rad electron beam of an electron accelrated voltage of 175 kV passing at a convayer speed of 10 m/min.

When the thus obtained board was evaluated for adhesion properties, transparency and hardwearing properties according to the same procedures as in Example 1, the following results were obtained: adheasion properties, 100/100; haze, 0.5%; and $\Delta H$, 7.2%, showing good hardwearing properties.

Next molded board was obtained by the same method as in Example 14. There was no crack at the hardcoated layer of thus obtained molded board, showing good formed material obtained.

What is claimed is:

1. An ultraviolet-curing covering composition with hardwearing properties comprising:

Component A: a compound which is obtained by reacting a hydroxyl group-containing polyfunctional acrylate having a hydroxyl group(s) and 3 or more acryloyl groups in the molecule with a silane coupling agent containing an isocyanate group(s) of the following general formula (1):

$$(R^1O)_a-\underset{\underset{R_b^2}{|}}{Si}-[R^3-NCO]_c \tag{1}$$

(wherein $R^1$ and $R^2$ are the same or different monovalent hydrocarbon groups, $R^3$ is a divalent hydrocarbon group having from 2 to 8 carbon atoms; and a is an integer of 2 to 3, b is an integer of 0 to 1, and c is an integer of 1 or 2 which is equal to 4-a-b) ;

Component B: a polyfunctional acrylate having 3 or more acryloyl groups in the molecule;

Component C: a silica sol in an organic solvent as a dispersing medium; and

Component D: a photopolymerization initiator.

2. The composition as claimed in claim 1 wherein the weight ratios of Component A/Component B are from 0.1 to 10, and the weight ratio of the silica sol solid content of Component C/[Component A +Component B] are from 0.1 to 5.

3. An ultraviolet-curing covering composition with hardwearing properties comprising following Component E and Component F in addition to the Components of claim 1:

Component E: an acrylic resin;
Component F: an organic solvent.

4. The composition as claimed in claim 3 wherein the ratios of Component A, Component B, the silica sol solid content of Component C and Component E relative to the total weight thereof are as follows:

| | |
|---|---|
| Component A + Component B | 25–60% by weight |
| Silica sol solid content of Component C | 20–70% by weight |
| Component E | 5–35% by weight, and | the weight ratio of Component A/Component B is 0.2 or more.

5. The composition as claimed in claim 3 wherein said acrylic resin of Component E is selected from the group consisting of the following Compounds (a) to (d):

Compound (a): Polymers or copolymers of (meth)acrylic acid esters;

Compound (b): Polymers or copolymers of (meth) acrylic acid esters having (meth)acryloyl groups at their side chains;

Compound (c): Acrylic silicone resins having alkoxysilyl groups; and

Compound (d): Acrylic silicone resins having alkoxysilyl groups and polyorganosiloxane units.

6. The composition as claimed in claim 1 or 3 wherein said silane-coupling agent containing an isocyanate group(s) is selected from the group consisting of 3-isocyanatopropyl trimethoxysilane, 2-isocyanatoethyl trimethoxysilane, 3isocyanatopropyl triethoxysilane, 2-isocyanatoethyl triethoxysilane, 3-isocyanatopropyl methyldimethoxysilane, 2isocyanatoethyl methyl dimethoxysilane, 3-isocyanatopropyl methyldiethoxysilane and 2-isocyanatoethylmethyl diethoxy-silane.

7. The composition as claimed in claim 1 or 3 wherein said hydroxyl group-containing polyfunctional acrylate having a hydroxyl group(s) and 3 or more acryloyl groups in the molecule of Component B is selected from the group consisting of dipentaerythritol hexacrylate, dipentaerythritol pentacrylate, and a mixture thereof.

8. The composition as claimed in claim 3 wherein a part of Component B is replaced by urethane-acrylate having 2 or more acryloyl groups in the molecule.

* * * * *